March 15, 1966  E. EPPLER  3,240,085
POSITIONING TABLE

Filed April 17, 1963

INVENTOR.
EUGENE EPPLER

BY Lindsey, Prutzman and Hayes

ATTORNEYS

March 15, 1966  E. EPPLER  3,240,085
POSITIONING TABLE

Filed April 17, 1963  2 Sheets-Sheet 2

INVENTOR.
EUGENE EPPLER
BY Lindsey, Prutzman and Hayes
ATTORNEYS

United States Patent Office 3,240,085
Patented Mar. 15, 1966

3,240,085
POSITIONING TABLE
Eugene Eppler, 1256 Blvd., West Hartford, Conn.
Filed Apr. 17, 1963, Ser. No. 273,620
11 Claims. (Cl. 77—64)

The present invention relates to work holding and positioning tables particularly useful for facilitating the duplicaton of a number of workpieces being successively machined.

It is a principal aim of the present invention to provide a new and useful positioning table of the type described which is ideally suited for applications requiring a high degree of machining precision, and which is nevertheless adapted for facile operation even by an unskilled operator.

Another aim of the present invention is to provide a new and improved positioning table of the type described which is equally useful in the machining of a large number of similar workpieces or only a few similar workpieces and with which the change-over for a different workpiece can be readily and easily accomplished.

A further aim of the present invention is to provide a new and useful positioning table of the type described which can precisely position the workpiece prior to the commencement of the machining operation and which thereafter accurately retains the workpiece in its selected position so that close machining tolerances can be obtained.

Another aim of the present invention is to provide an improved positioning table that is independently operable by a single manual control.

A still further aim of the present invention is to provide a new and improved positioning table of economical construction, which is easy to set up and operate, and which nevertheless is compact and sturdy and gives reliable performance over a long service life.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
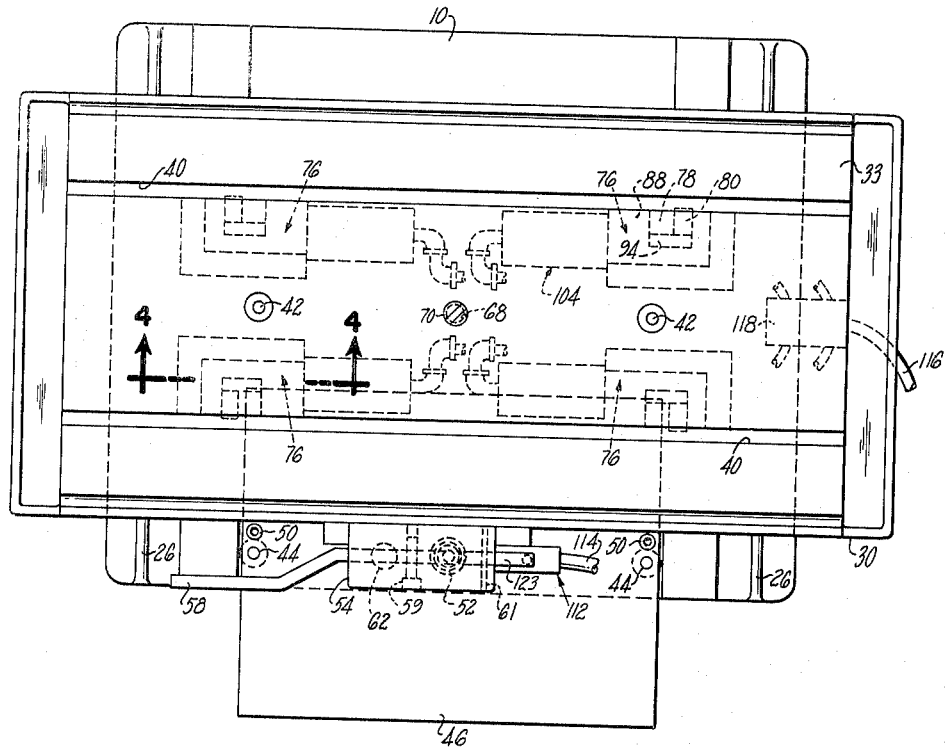
FIG. 1 is a top plan view, partly broken away, of a preferred embodiment of the positioning table of the present invention.

The positioning table of the present invention provides special advantages with respect to ease of operation, table rigidity and positioning precision over known positioning tables, such as for example the table disclosed in United States Patent No. 2,880,632 of Arnold S. Charlat entitled "Positioning Table" and issued April 7, 1959. Such advantages and others will become readily obvious upon a full explanation of the present invention.

Referring now to the drawings in detail, the preferred embodiment of the positioning table of the present invention comprises a rigid base 10 that is provided with a pair of oppositely extending slotted projections 12 for securing the base, as by bolts or the like, in appropriate relation to an associated device, as for example a drilling machine, with which the table cooperates. Spaced above the base 10 is a carriage or saddle 14 that is supported on the base by a pair of bearings 15 comprised of hardened steel rails 16, 18 fixed to the base and carriage, respectively, and hardened steel balls 20 located in opposed V-shaped grooves in the rails. In the usual manner a ball retainer 22 is provided to evenly space the balls 20 within the grooves. Depending from the carriage 14 are a plurality of elongated ribs 24 which increase the rigidity of the carriage and which coact with similar upstanding elongated strengthening ribs 26 on the base 10 to provide a labyrinth seal for the supporting bearings 15 of the carriage.

A rigid table 30 is spaced above the carriage 14 and supported thereon by a pair of bearings 32 substantially identical to the bearings 15 supporting the carriage. The bearings 32 extend perpendicular to the bearings 15 of the carriage 14 and, accordingly, the table 30 is freely movable on the carriage in a direction perpendicular to the direction of movement of the carriage on the base. The table is therefore supported for two-dimensional movement parallel to the plane of the face 33 of the table with suitable end stops (not shown) being provided to limit the lateral movement of the carriage on the base and the table on the carriage. As with the carriage and base, ribs 34, 36 are provided on the table and carriage, respectively, to strengthen those members and to provide a labyrinth seal for the table bearings 32. The table 30 is provided with a pair of inverted T-shaped slots 40 which, in the preferred embodiment, extend parallel to the table bearings 32. The slots 40 are useful in the well-known manner for clamping, or otherwise securing, a workpiece supporting jig or other workpiece clamping device to the table.

A pair of upright locating pins 42 are threaded into the table 30 and project upwardly from the face thereof for proper location on the table of a jig or other clamping device for the workpiece, or where feasible, the workpiece itself. A pair of similar upright locating pins 44 are threaded into the base 10 and adjacent the front edge thereof. Preferably the locating pins 44 have a spacing equal to the spacing of the pins 42 and are in parallel alignment with the pins 42, the bearings 32 and the slots 40.

Figure 2:
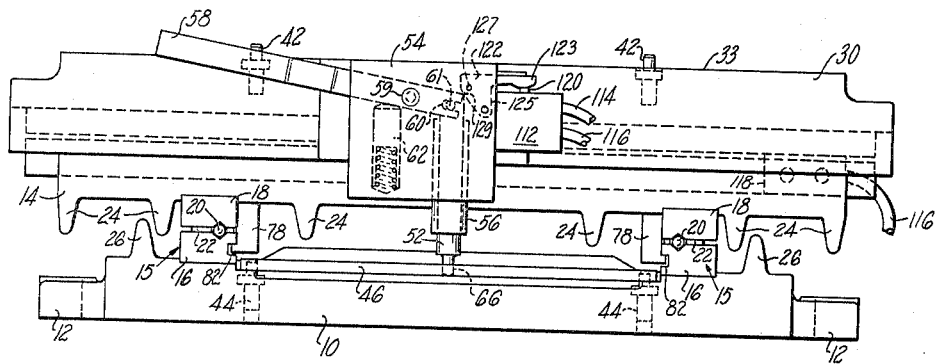
FIG. 2 is a front elevation view, partly broken away, of the positioning table.
Figure 3:
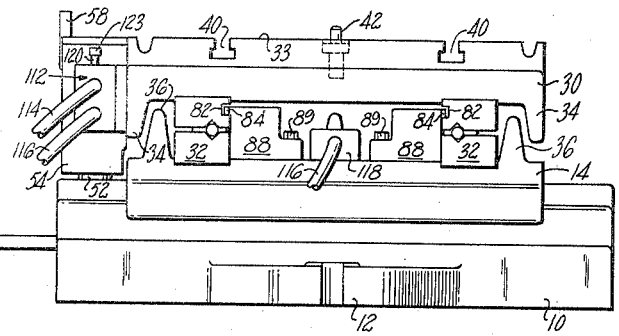
FIG. 3 is a side elevation view, partly broken away, of the positioning table.

For selective positioning of the table, a template 46 is mounted on the base 10. The template has a pair of accurately machined openings receiving the locating pins 44 and is fixed to the base by a pair of set screws 50 (FIG. 1). Above the template 46 is a locating plunger 52 which is mounted for vertical reciprocable movement in a bushing 56 in a housing 54 affixed to the front edge of the table. A manually operable handle 58 is pivotally mounted within the housing 54 by a pivot pin 59 and for operatively connecting the handle to the plunger there is provided an elognated slot 60 in the end of the handle which receives a transverse pin 61 fixed between the upper bifurcated end portions of the plunger. A spring biased plunger 62 urges the lever 58 in the clockwise direction, as seen in FIG. 2, to retain the plunger 52 in engagement with the template, and the handle 58 is manually operable downwardly to move the plunger upwardly out of coaction with the template.

For receiving the lower reduced accurately machined end of the aligning plunger 52, the template 46 is provided with one or more accurately located aligning holes which appropriately correspond with the operating or machining positions of the workpiece supported on the table. For initially aligning the table relative to the associated device, as for example a drilling machine, an opening 66 midway between the locating pins 44 is provided in the template 46 and a similar opening 68 midway between the locating pins 42 is provided in the table 30. The opening 68 is counter-bored and threaded and is normally covered by a cap screw 70. By positioning the aligning plunger 52 in the central opening 66 of the template and by moving the base for appropriately aligning an accessory pin or dowel (not shown) placed in the central opening 68 coaxially with the chuck of the drilling machine, the table is placed in alignment with the machine. The base is thereafter rigidly secured against further movement.

Figure 4:
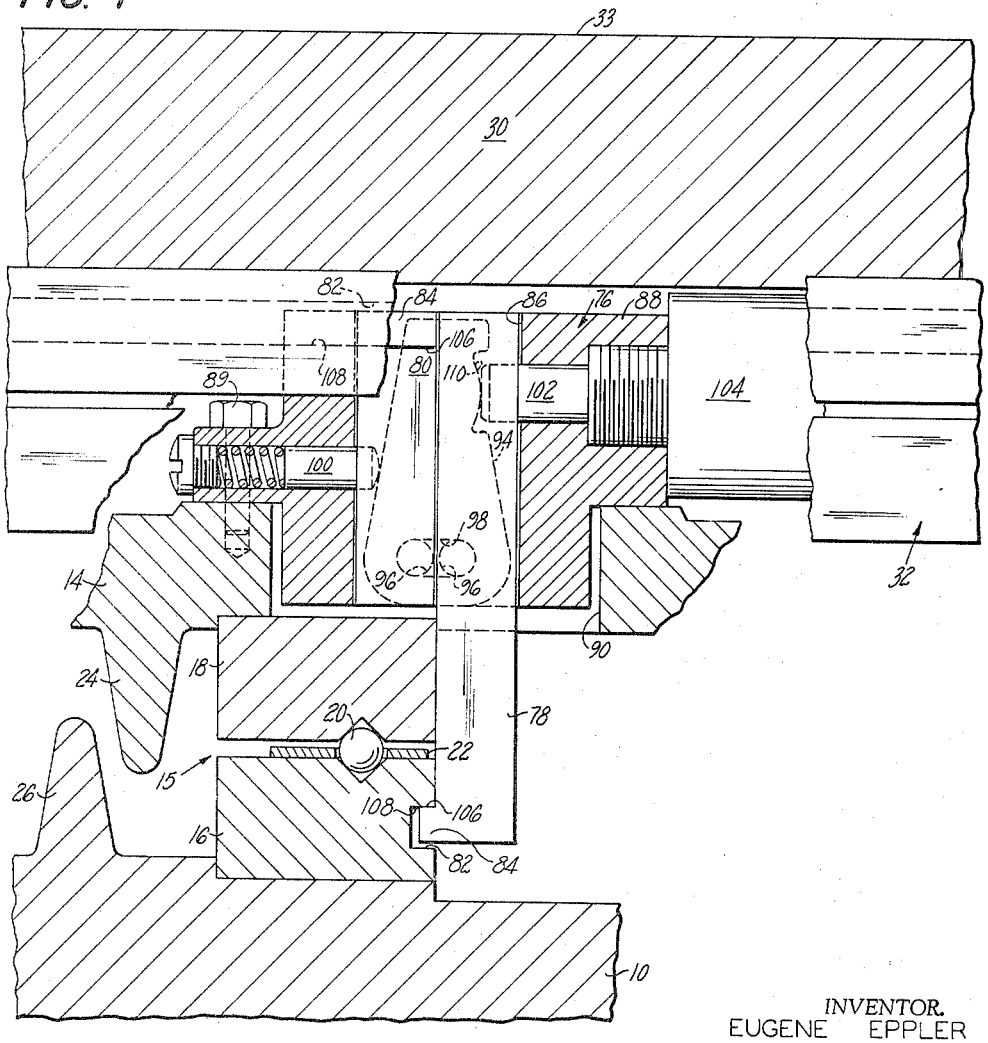
FIG. 4 is an enlarged fragmentary section view, partly broken away, taken along the line 4—4 of FIG. 1.

Four locking assemblies, denoted by the numeral 76, are mounted on the carriage 14 to provide for selective locking of the table 30 to the base 10. The locking assemblies 76 are located at the intersection of the supporting bearings 15, 32 and include a pair of generally L-shaped clamping arms 78, 80 extending respectively downwardly into engagement with the lower rail of the carriage supporting bearing 15 and upwardly into engagement with the upper rail of the table supporting bearing 32. As best seen in FIG. 4, the aforementioned rails have elongated slots 82 which receive laterally projecting lips 84 on the clamping arms. The clamping arms 78, 80 are loosely supported within a rectangular opening 86 in a housing 88 which is partially received within an opening 90 of the carriage and secured thereto by machine screws 89. A lever 94 also received within the opening 86 of the housing 88 is pivotally connected to the locking arms 78, 80 by a pair of transversely extending pins 96 fixed to the lever and received within slots 98 formed in the clamping arms. The lever 94 is urged to the right, as seen in FIG. 4, in the unlocking direction by a spring biased plunger 100, and actuated to the left, as seen in FIG. 4, in the locking direction by the plunger 102 of an air cylinder 104. The air cylinder is threaded to the housing 88 and plunger 102 is slidably received within an opening in the housing. With the admission of compressed air into the air cylinder 104, the plunger 102 is urged to the left to thereby retract the locking arms 78, 80 and bring about engagement of the shoulders 106 of the lips 84 with the shoulders 108 of the slots 82. The lever 94 pivots substantially about an imaginary axis lying between the transverse pins 96 during the activation and deactivation of the locking assembly and is contoured with a convex arcuate shoulder 110 engageable by the end of the plunger 102 to provide a bearing surface engageable by the plunger.

The admission and exhausting of air to the cylinders 104 is controlled by a valve, generally denoted by the numeral 112, having an inlet conduit 114 adapted for connection to an air supply and an outlet conduit 116 connected to a manifold 118 in turn connected through suitable conduits to the four air cylinders 104. The valve 112 is actuated by a pawl or bell crank 122 pivotally mounted on the housing 54 and having an arm 123 engageable with a valve operating plunger 120. The other arm 125 of the bell crank has a transverse pin 127 engageable by the upper chamfered edge 129 of the aligning plunger. Accordingly, when the plunger 52 is moved upwardly out of contact with the template 46 by the operation of the handle 58, the bell crank 122 is actuated clockwise (as seen in FIG. 2) by the edge 129 of the plunger to exhaust the air within the cylinders 104. With the operation of the plunger 52 downwardly into coaction with an opening in the template the valve 112 is operated to direct compressed air to the air cylinders 104 for locking the table.

The template can be provided with any number of accurately located machined openings adapted for receiving the reduced end of the plunger 52 for locating the table and its supported workpiece at an equal number of machining stations. These template openings are appropriately located relative to the central opening 66 in the template and relative to the axis extending between the openings provided for the locating pins 44 in accordance with the location of the machining stations relative to the central opening 68 in the table 30 and the axis extending between the locating pins 42.

It can be seen, therefore, that the positioning table of the present invention can be readily adjusted for accurately aligning a workpiece in appropriate relation with an associated device and is thereafter rigidly retained in the selected position for the performance of the desired machining or other operation. Additionally the positioning table is conveniently operable by a single handle and the template is located for extension forwardly of the front edge of the base for ready observation with the result that even an unskilled operator could operate the table with efficiency and ease.

Further, as the template is readily accessible and as it may be replaced merely by the removal of a pair of set screws, a new template can be readily inserted to provide a quick change-over from one preselected set of operation stations to another.

As will be apparent to persons skilled in the art, various modifications and adaptations of the structure above described will become readily apparent without departure from the spirit and scope of the invention, the scope of which is defined in the appended claims.

I claim:

1. A positioning device comprising a base, a carriage, means supporting the carriage for rectilinear movement in a first direction on the base, a table, means supporting the table for rectilinear movement on the carriage in a second direction perpendicular to said first direction, means for selectively positioning the table relative to the base, and means for locking the table to the base comprising at least one pair of clamping arms mounted on the carriage, one arm of said pair extending downwardly and the other arm of said pair extending upwardly from said carriage, means providing oppositely facing elongated shoulders on the base and table extending parallel to said first and second directions respectively, said clamping arms having parts engageable with said elongated shoulders for locking the table to the carriage and the carriage to the base, a lever pivotally connected to each of said arms, means urging the lever in one pivotal direction for extending the arms from the carriage, and fluid actuated means for moving the lever in the opposite pivotal direction for retracting the arms.

2. A positioning device comprising a base, a carriage, means supporting the carriage for rectilinear movement in a first direction on the base, a table, means supporting the table for rectilinear movement on the carriage in a second direction angularly related to said first direction, said base and table having outwardly facing elongated shoulders extending parallel to said first and second directions respectively, and means mounted on the carriage for locking the table to the base comprising at least one pair of oppositely extending generally L-shaped clamping arms having inwardly facing shoulders engageable with said elongated shoulders of the base and table, and means for relatively withdrawing and extending the clamping arms for locking and unlocking the table to the base respectively.

3. A positioning device comprising a base, a carriage, a first pair of parallel elongated bearing means supporting the carriage for rectilinear movement in a first direction on the base, a table, a second pair of parallel elongated bearing means supporting the table for rectilinear movement on the carriage in a second direction perpendicular to said first direction, said second pair of bearing means crossing over said first pair of bearing means whereby four crossings of the first and second pairs of bearing means are provided, and four locking means mounted on the carriage adjacent to said four crossings adapted for locking the table to the base.

4. A positioning device for a workpiece jig comprising a base member, a table member, means supporting the table member for movement in two mutually perpendicular directions on the base member, a first pair of upright locating pins fixed to the table member adapted for locating the workpiece jig thereon, a second pair of upright locating pins fixed to the base member, said first and second pairs of locating pins being in parallel alignment, a template having a pair of spaced openings receiving the second pair of locating pins for locating the template on said base member, manually operable means mounted on the table member movable into coaction with the template for selectively positioning the table member comprising a plunger reciprocably mounted for movement into and out of operative engagement with the template, and a manually operable lever operatively connected to the plunger; and clamping means operable in conjunction with the movement of the plunger for clamping the table member to the base member when the plunger is in operative engagement with the template and for releasing the table member for movement when the plunger is out of operative engagement with the template.

5. A positioning device comprising a base, a carriage, a first pair of spaced elongated parallel bearings interposed between the base and carriage spacing the carriage above the base and supporting the carriage for rectilinear movement on the base in a first direction, a table, a second pair of spaced elongated parallel bearings interposed between the carriage and table supporting the table above the carriage for rectilinear movement in a second direction perpendicular to the first direction of movement of the carriage on the base, a template removably mounted on the base between said first pair of spaced elongated parallel bearings and at one longitudinal end thereof for visual observation; aligning means supported on the table above the template adapted for operative engagement with the template comprising a vertically reciprocable plunger adapted for movement downwardly into operative engagement with the template, means urging the plunger downwardly, and manually operable means connected for raising the plunger; and locking means for locking the table to the base comprising elongated parts on the base and table extending in said first and second directions of rectilinear movement respectively, and means supported by the carriage and operable with the plunger in operative engagement with the template for engaging the elongated parts for locking the table to the base.

6. The positioning device of claim 5 wherein the elongated parts comprise upwardly facing elongated shoulder means on the table and downwardly facing elongated shoulder means on the base, and wherein the means supported by the carriage comprises a clamping mechanism operable for engagement with the upwardly facing and downwardly facing shoulder means for directly clamping the table to the base.

7. The positioning device of claim 6 wherein the locking means comprises fluid motor means for operation of the clamping mechanism, and control valve means for operating the fluid motor means, said control valve means being operable with the plunger to unclamp the table when the plunger is raised.

8. A positioning device comprising a base, a carriage, means supporting the carriage for rectilinear movement in a first direction on the base, a table, means supporting the table for rectilinear movement on the carriage in a second direction perpendicular to said first direction, means for selectively positioning the table relative to the base, and means mounted on the carriage for locking the table to the base comprising at least one pair of clamping arms supported for reciprocable movement on the carriage, one arm of said pair extending downwardly and the other arm of said pair extending upwardly from said carriage, said table and base having means defining elongated shoulders extending parallel to said second and first directions respectively, said clamping arms having parts engageable with said elongated shoulders, and means for moving the clamping arms into locking engagement with the table and base.

9. A positioning device comprising a base, a carriage, means supporting the carriage for rectilinear movement in a first direction on the base, a table, means supporting the table for rectilinear movement on the carriage in a second direction angularly related to said first direction, and means for locking the table to the base, said locking means comprising elongated parts on the base and table extending in said first and second directions respectively and a pair of locking parts mounted on the carriage for movement into locking engagement with said elongated parts respectively for locking the table to the base, and means pivotally connected to the locking parts for actuating them into and out of locking engagement with the elongated parts.

10. A positioning device comprising a base, a carriage, first bearing means supporting the carriage for rectilinear movement in a first direction on the base, a table, second bearing means supporting the table for rectilinear movement on the carriage in a second direction angularly related to said first direction, the first and second bearing means including pairs of cooperating rails fixed to the carriage and base and to the table and carriage respectively, the rails fixed to said base and table having respectively downwardly and upwardly facing elongated shoulders extending parallel to said first and second directions respectively, and fluid operated clamping means mounted on the carriage engageable with said elongated shoulders for clamping the table to the base.

11. A positioning device comprising a base, a carriage, first bearing meaens supporting the carriage for rectilinear movement in a first direction on the base, a table, second bearing meeans supporting the table for rectilinear movement on the carriage in a second direction angularly related to said first direction, the first and second bearing means including pairs of cooperating rails fixed to the carriage and base and to the table and carriage respectively, the rails fixed to said base and table having oppositely facing elongated shoulders extending parallel to said first and second directions respectively, and locking means mounted on the carriage engageable with said elongated shoulders for locking the table to the base comprising a pair of oppositely extending locking arms having shoulders engageable with said elongated shoulders, a lever pivotally connected to each of said locking arms, and means for actuating said lever.

References Cited by the Examiner

UNITED STATES PATENTS

| 447,014 | 2/1891 | Pryibil | 77—64 |
| 2,946,247 | 7/1960 | Lassy | 77—64 |
| 3,126,768 | 3/1964 | Gondek | 77—64 |

FOREIGN PATENTS

| 668,881 | 3/1952 | Great Britain. |
| 894,258 | 4/1962 | Great Britain. |

WILLIAM W. DYER, Jr., *Primary Examiner.*

FRANCIS S. HUSAR, *Examiner.*